(12) United States Patent
Baker et al.

(10) Patent No.: US 7,922,418 B2
(45) Date of Patent: Apr. 12, 2011

(54) MOUNTING ASSEMBLY

(75) Inventors: Marcus Baker, Bristol (GB); Andrew Slayne, Bristol (GB)

(73) Assignee: Saint-Gobain Performance Plastics Rencol Limited, Bristol (GB)

(*) Notice: Subject to any disclaimer, the term of this patent is extended or adjusted under 35 U.S.C. 154(b) by 0 days.

(21) Appl. No.: 12/033,241

(22) Filed: Feb. 19, 2008

(65) Prior Publication Data

US 2008/0199254 A1 Aug. 21, 2008

Related U.S. Application Data

(60) Provisional application No. 60/890,736, filed on Feb. 20, 2007.

(51) Int. Cl.
F16B 2/24 (2006.01)

(52) U.S. Cl. ............ 403/372; 384/535; 360/265.2

(58) Field of Classification Search ............ 403/367, 403/371, 372; 411/520, 521; 384/535, 581; 360/97.02, 265.2, 265.6, 266.1
See application file for complete search history.

(56) References Cited

U.S. PATENT DOCUMENTS

| | | | | |
|---|---|---|---|---|
| 3,061,386 A | * | 10/1962 | Dix et al. | 384/535 |
| 3,142,887 A | * | 8/1964 | Hulck et al. | 29/898.06 |
| 3,438,660 A | | 4/1969 | Steiner | |
| 3,700,271 A | * | 10/1972 | Blaurock et al. | 403/372 |
| 3,838,928 A | * | 10/1974 | Blaurock et al. | 403/372 |
| 4,286,894 A | * | 9/1981 | Rongley | 403/372 |
| 4,790,683 A | * | 12/1988 | Cramer et al. | 403/372 |
| 4,828,423 A | * | 5/1989 | Cramer et al. | 403/372 |
| 4,981,390 A | * | 1/1991 | Cramer et al. | 403/371 |
| 6,288,878 B1 | * | 9/2001 | Misso et al. | 360/264.3 |
| 6,411,472 B1 | * | 6/2002 | Allsup | 360/265.7 |
| 2002/0039461 A1 | * | 4/2002 | Obara et al. | 384/535 |
| 2005/0077101 A1 | | 4/2005 | Yamamoto et al. | |
| 2005/0225903 A1 | * | 10/2005 | Sprankle et al. | 360/264.3 |
| 2006/0181811 A1 | * | 8/2006 | Hanrahan et al. | 360/265.2 |
| 2006/0275076 A1 | | 12/2006 | Hanrahan et al. | |
| 2007/0291417 A1 | * | 12/2007 | Woodhead et al. | 360/265.2 |
| 2008/0043375 A1 | * | 2/2008 | Hanrahan et al. | 360/265.6 |

FOREIGN PATENT DOCUMENTS

WO 0141136 A1 6/2001

OTHER PUBLICATIONS

Plastic Deformation; Author Unknown; Matter Project, University of Liverpool; 1 page (1999).
Beer et al.; Mechanics of Materials; section 2.6, Elastic Versus Plastic Behavior of Material; McGraw-Hill Book Co.; pp. 39 to 41 (1981).
A.R. Slayne; "Performance Characteristics of Actuator/Bearing Joints Made With Tolerance Rings"; Magnetic Recording Conference, 2002. Digest of Asia-Pacific; ISBN: 0-7803-7509-2; pp. WE-P-14-01 to WE-P-14-02; Dec. 10, 2002.

* cited by examiner

Primary Examiner — Michael P Ferguson
Assistant Examiner — Joshua T Kennedy (57) ABSTRACT

A mounting assembly comprising mating inner and outer components (36, 38) mounted together using a tolerance (20) is disclosed. The tolerance ring (20) has radially extending projections (28) that are configured to cause the tolerance ring (20) to operate into the plastic phase of its compression force/retention force characteristic. This can be achieved by using softer projections than those found in conventional tolerance rings. The force required to mount the tolerance ring and a range of retention forces exhibited by it for a given variance in sizes of mating components is thereby stabilized.

20 Claims, 6 Drawing Sheets

MOUNTING ASSEMBLY

CROSS REFERENCE TO RELATED APPLICATION

This application is a utility patent application based on U.S. Provisional Patent Application No. 60/890,736 filed on Feb. 20, 2007, the benefit of which is hereby claimed under 35 U.S.C. §119 and the disclosure of which is herein incorporated by reference in its entirety.

FIELD OF THE INVENTION

The invention relates to apparatus comprising mating inner and outer components, which are mounted together using a tolerance ring. For example, the invention can be used for mounting a shaft in a bore formed in a housing.

BACKGROUND OF THE INVENTION

It is known to connect together mating inner and outer components using a tolerance ring. For example, a tolerance ring may be used to hold a shaft in place in a corresponding bore, or it may act as a force limiter to permit torque to be transmitted between the shaft and the housing. The use of a tolerance ring accommodates minor variations in the diameter of the inner and outer components without substantially affecting their interconnection.

Typically, a tolerance ring comprises a band of resilient material, e.g. a metal such as spring steel, the ends of which are brought together to form a ring. A strip of projections extend radially outwards from the ring, or radially inwards towards the centre of the ring. The projections can be formations, possibly regular formations, such as corrugations, ridges, waves or fingers.

In use, the tolerance ring is located between the components, e.g. in the annular space between the shaft and the bore in the housing, such that the projections are compressed. Each projection acts as a spring and exerts a radial force against the components, providing an interference fit between them. Rotation of the inner or outer component will produce similar rotation in the other component, as torque is transmitted by the ring. Likewise, linear movement of either component will produce similar linear movement in the other component, as linear force is transmitted by the ring.

If forces (rotational or linear) are applied to one or both of the inner and outer components, such that the resultant force between the mating components is higher than a certain threshold value, the inner and outer components will move relative to one another, i.e. they will slip.

Although tolerance rings usually comprise a strip of resilient material that is curved to allow the easy formation of a ring by overlapping the ends of the strip, they may also be manufactured as an annular band.

During assembly of an apparatus with an interference fit between components, a tolerance ring is typically held stationary with respect to a first (inner or outer) component whilst the second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

One example of the use a tolerance ring is in a hard disk drive pivot mount, where the tolerance ring provides axial retention between a rotatable pivot shaft and an arm mounted thereon. These components are delicate, which imposes constraints on the size of assembly force and compression forces that can be used.

Furthermore, the coupling between the mating components may exhibit resonant behaviour, i.e. where external vibrations are amplified in the coupling. The resonant frequency or frequencies of an assembly are important in determining the operation of that assembly. For example, in hard disk drive pivot mounts accurate data writing cannot take place when resonance occurs, so it is important to know the frequency of resonance. The resonant frequency may depend on amount of compression that takes place during installation, i.e. may depend on an assembly force.

SUMMARY OF THE INVENTION

At its most general, the invention provides a tolerance ring for delicate assemblies having a configuration which makes it less sensitive to variations in compression force. Thus, various properties exhibited by the tolerance ring may be more stable over a given variation in size between an inner and an outer component. For example, the assembly force for the tolerance ring may be more stable which may permit greater control over the resonant frequency of an assembly. Furthermore, where the tolerance ring is mounted on a bearing, the invention can stabilise, i.e. reduce the variation in, the increase in bearing torque caused by the tolerance ring.

Every tolerance ring has a characteristic profile that is a relation between its experienced compression force (which is typically a function of the clearance between the mating inner and outer components) and the retention force it exerts. Typically, such a characteristic profile will include an elastic phase, within which the projections on the tolerance ring deform resiliently, and, beyond a threshold compression force, a plastic phase. In the plastic phase the tolerance ring may still exhibit some resilient behaviour, but there is some permanent deformation of the projections. The plastic phase is also characterised in that a change in retention force for a given change in compression force is less than in the elastic phase.

Conventional tolerance rings for delicate assemblies operate in the elastic phase. In part, this is due to an assumption that the elastic phase offers the ability to compensate for variations in the assembly during use, e.g. caused by temperature changes. Also, operating in the elastic phase offered a way to meet the constraints on the magnitude of installation (assembly) force, compression force and retention force associated with delicate assemblies.

The invention provides an tolerance ring configuration in which, for compression forces and retention forces suitable for delicate assembly components, the tolerance ring operates into its plastic phase. It is based on the discovery that operating into the plastic phase does not materially affect the resonant frequency of the assembly. As a result, for a given range of compression forces, e.g. corresponding to variance in the sizes of the mating components, the range of compressive forces exerted by the tolerance ring (when assembly is complete) is smaller, i.e. the force exerted by the tolerance ring within the assembly is more stable. Moreover, by operating into the plastic phase, the force required to mount the tolerance ring in an assembly can also be stabilised. The resonant frequency is therefore more tightly controllable.

According to one aspect of the invention, there may be provided a tolerance ring for providing an interference fit between an inner component and an outer component, the tolerance ring comprising a band having a plurality of radially extending projections which are compressible between the inner and outer components, such that in use the band is arranged to exhibit plastic behaviour when compressed between the inner and outer components. The tolerance ring may be made of a material and sized to be suitable for delicate assemblies. For example, the band may have a diameter of less than 16 mm. The band may be made of non-carbon steel. Its thickness may be less than 0.2 mm.

Plastic behaviour means that in use, the tolerance ring operates on a flattened portion of its compression force/retention force characteristic (i.e. a portion that is less steep than the elastic phase). The flattened portion may include a transition region between the elastic phase and plastic phase. The configuration of the tolerance ring is chosen such that the plastic behaviour is exhibited at compression forces which are conventionally associated with elastic behaviour. Furthermore, the retention force of the tolerance ring according to the invention may be in the same range as conventional tolerance rings.

To achieve the altered characteristic, the projections on the tolerance ring can be made more gentle. This can be achieved in a variety of ways, such as increasing the ratio of projection circumferential width to overall ring diameter (i.e. smoothing out the gradient to each projection peak), blending each projection into the ring body in either or both of the circumferential and axial directions, altering projection peak height, etc.

The ring may include more than one series of projections, axially separated from each other. Each projection may comprise a rounded ridge rising to and falling from a radial peak. The projections in each series may be equally spaced. The projections may extend inwardly or outwardly from a circumferential surface of the tolerance ring.

The tolerance ring may be an open or closed loop of resilient material, i.e. it may extend entirely or partly around the perimeter of the shaft. The projections may be arranged such that pairs of projections are diametrically opposing. There may be an equal distance between the longitudinal axis of the bore of the housing and the peak of each of the projections. In this case, the peak radius can be measured from the longitudinal axis to the peak of any one of the projections.

The inner and outer components may comprise a shaft that is receivable in a bore formed in a housing. The shaft may be a solid or a hollow component, or the outer part of a complex component formed of several parts, such as a bearing. The bore may extend fully through the housing, or only extend partially through or into the housing.

Another aspect of the invention may provide apparatus comprising an inner component, an outer component which mates with the inner component, and a tolerance ring located between the inner and outer components, the tolerance ring comprising a band having a diameter of less than 16 mm, wherein the band includes a plurality of radially extending projections which are compressible between the inner and outer components, such that the band exhibits plastic behaviour when compressed between the inner and outer components. The apparatus may be a hard disk drive pivot mount, wherein the housing comprising a arm and the shaft comprises rotatable pivot.

In one embodiment, the compression force (which will typically not exceed 10,000 N) is sufficient to cause the deformation of the band (i.e. tolerance ring) to exhibit plastic behaviour. In a particular embodiment, the tolerance ring is arranged to operate in a flattened portion of its compression force/retention force characteristic so that the projections exhibit plastic behaviour under compression between the inner and outer components. The flattened portion of the compression force/retention force characteristic includes a transition region from an elastic portion to a plastic portion of the characteristic. The projections are configured to cause the transition region to occur with a corn cession force less than 3500 N.

Further aspects of the invention may include a method of assembling an apparatus according to the second aspect, and a pre-assembly comprising a tolerance ring according to either the first or the second aspect securely mounted on a shaft or within a bore of a housing.

BRIEF DESCRIPTION OF THE DRAWINGS

An embodiment of the invention is described below with reference to the accompanying drawings, in which.

DETAILED DESCRIPTION OF THE INVENTION

Figure 1:
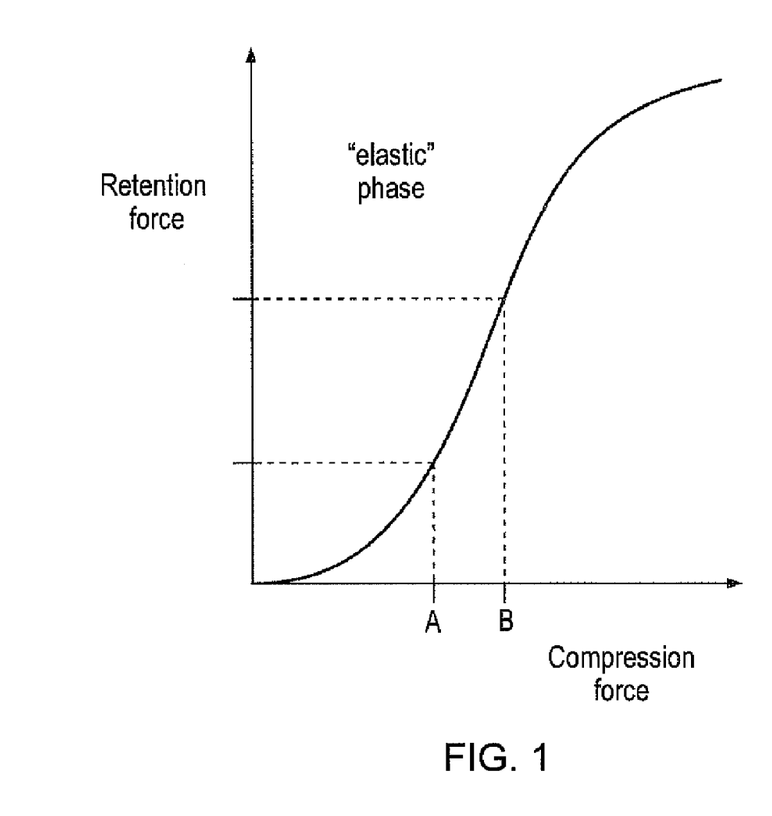
FIG. 1 shows a compression force/retention force profile for a conventional tolerance ring.
Figure 2:
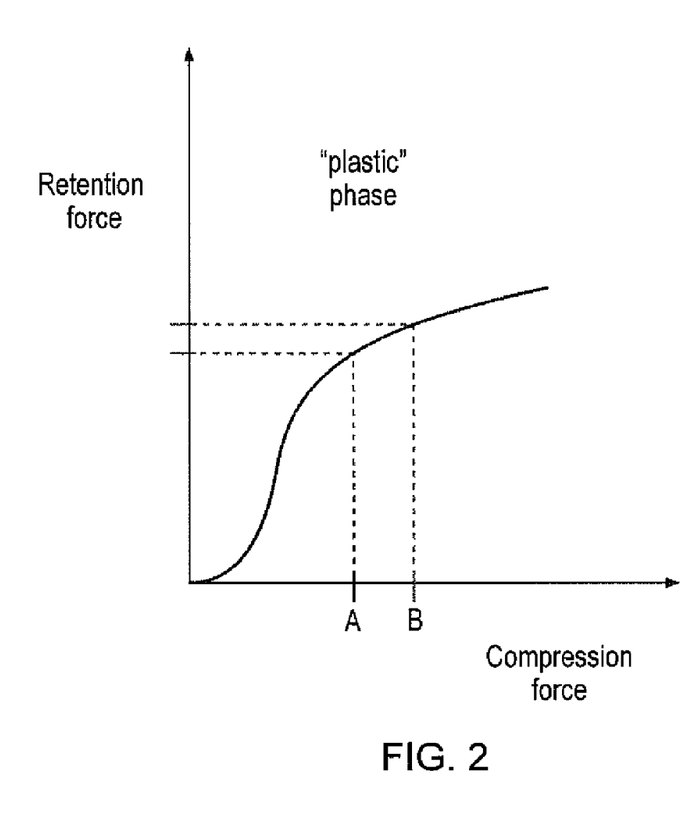
FIG. 2 shows a compression force/retention force profile for a tolerance ring that is an embodiment of the invention.

FIGS. 1 and 2 are schematic representations of compression force/retention force profiles that are useful for illustrating the invention. The profile shown in FIG. 1 is illustrative of a profile of a conventional tolerance ring used for a delicate apparatus, such as a hard disk drive pivot mount. To prevent damage to the components of the apparatus, the force by which the tolerance ring is compressed between the components is limited to the range A-B shown in FIG. 1. In conventional tolerance rings, this range corresponds to an "elastic" phase of the characteristic behaviour of a tolerance ring. The compression force range A-B therefore corresponds to a wide range of retention forces. Since the actual value of the compression force depends on the relative sizes of the components of the apparatus, small variations in size can lead to large variation in the size of the retention force. The actual value for the retention force is therefore unstable. A disadvantage of this is that the apparatus may be more susceptible to damage through resonance.

The invention provides a tolerance configuration which shifts the characteristic profile such that the elastic phase occurs at lower compression forces. This is done my making the projections of a tolerance ring "softer", as explained below. FIG. 2 shows an illustrative compression/retention force profile for a tolerance ring according to the invention.

The range of compression forces A-B now correspond to a portion of the profile that is flattening out. This corresponds to "plastic" behaviour. The range of retention forces corresponding to the range of compression forces A-B is therefore much narrower; the retention force is therefore more stable.

Figure 3:
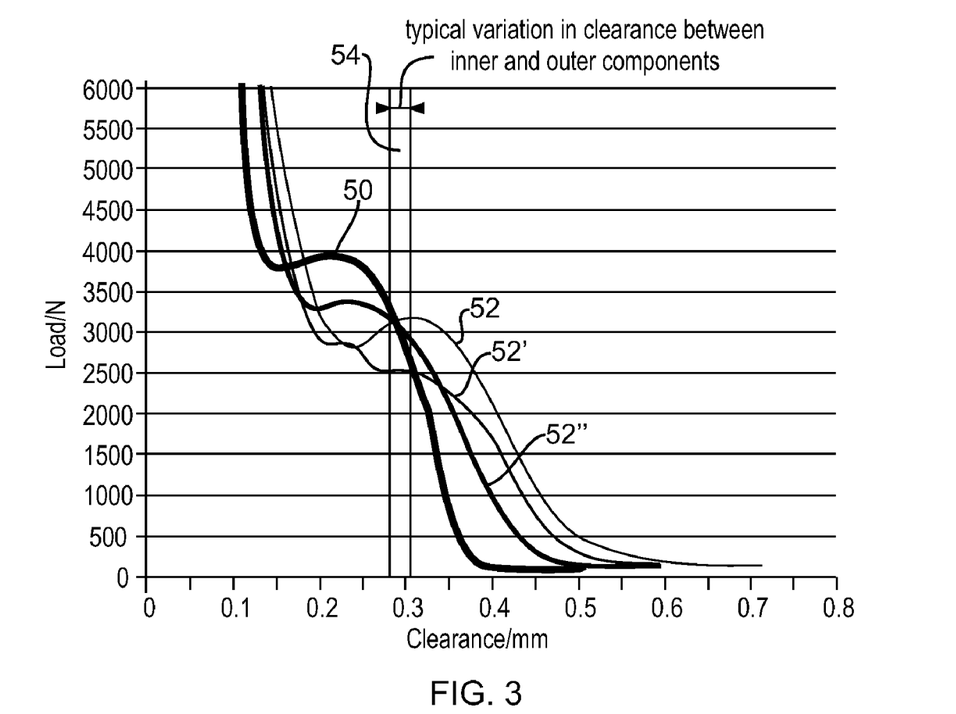
FIG. 3 shows a set of clearance/load profiles comparing a conventional tolerance ring profile with a plurality of alternative configurations.

FIG. 3 is a graph showing the compressive force exerted by a tolerance ring against the size of clearance between the inner and outer components in which it is mounted. A plurality of profiles is shown for illustrative purposes. A conventional tolerance ring exhibits profile 50, which has a steep slope in the region 54 that corresponding to typical clearances (bordered by two vertical lines in the drawing). This steep slope corresponds to the elastic behaviour in the tolerance ring. The other profiles 52, 52', and 52" are exhibited by tolerance rings whose projections have been 'softened' as described below. In the region 54, these profiles have a flatter (less steep) shape, which corresponds to more plastic behaviour according to the invention.

Figure 4:
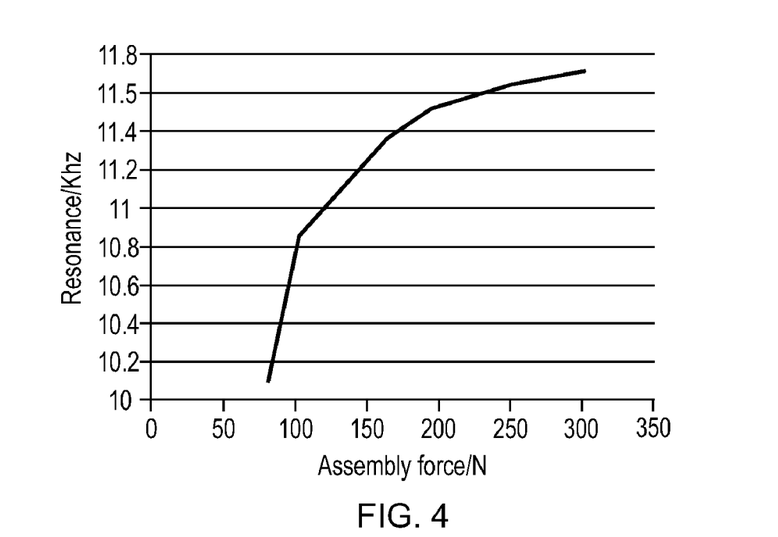
FIG. 4 is a graph showing a relationship between assembly force and resonant frequency.

One advantage of operating in the plastic phase of the tolerance ring characteristic is that the installation (assembly) force for the tolerance ring may be more stable, i.e. constrained within a smaller range of forces for a given possible variation in clearance between the inner and outer components. The size of the assembly force can be important in delicate assemblies, where damage to components is possible if the force is too high. Having a more stable assembly force therefore may make manufacture more efficient. Moreover, FIG. 4 is a graph showing a relationship between assembly force and resonant frequency. If assembly force is constrained within a smaller range, it follows from this diagram that resonant frequency may also be constrained in a smaller range. As explained above, knowledge of the location of the resonant frequency in important for the operation of assemblies which include tolerance rings. Limiting the range in which the resonant frequency can be is therefore a further advantage of the invention.

Figure 5:
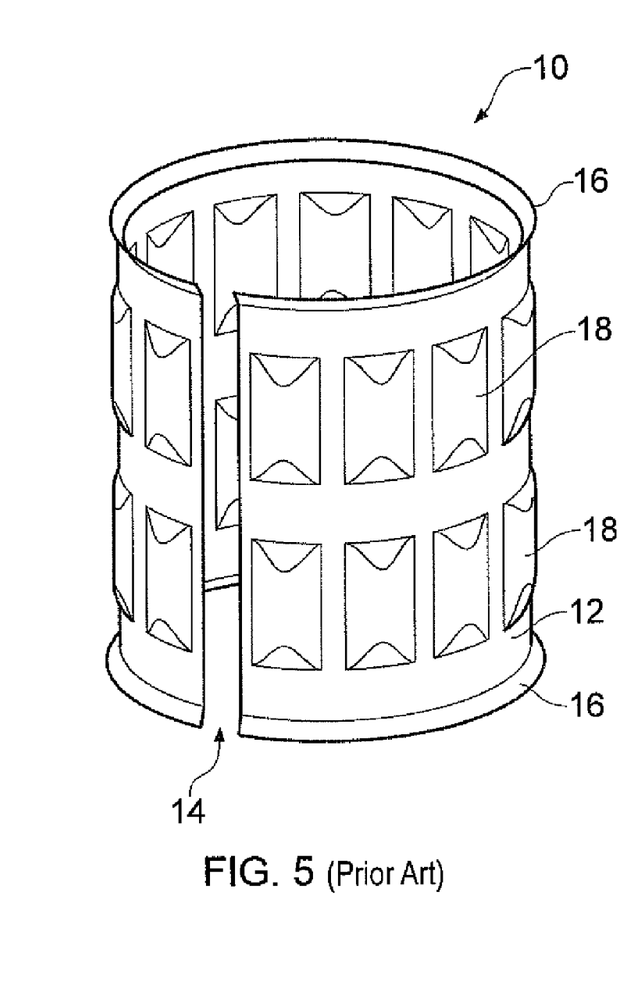
FIG. 5 shows a perspective view of a conventional tolerance ring.

FIG. 5 illustrates a conventional tolerance ring used in a hard disk drive pivot mount. The tolerance ring 10 comprises a cylindrical sleeve 12 formed by deforming a rectangular band of resilient material. The two ends of the rectangular band do not meet, so that there is an axial gap 14 running down the side of the sleeve 12. The top and bottom edges of the sleeve 12 have guide flanges 16 formed thereon, which act to aid the relative location of the components during assembly. In this embodiment, the guide flanges can be used to align a shaft (not shown) with the axis of the sleeve 12 as the axis is inserted through the sleeve.

The outer surface of the sleeve 12 has a plurality of projections 18 formed thereon. Each projection 18 has a circumferential hump which extends outwardly in the radial direction. Each hump has a circumferential width within which it rises to and falls from a peak. In FIG. 5, the humps are equally spaced around the circumference of the sleeve. There are also two series of humps, axially spaced from one another.

In use, the sleeve 12 is inserted in a bore in a housing. A shaft is inserted through the sleeve, which causes it to expand radially and compress the projections 18 against the walls defining the bore. The amount of compression depends on the relative sizes of the shaft and bore. The compression force is sufficient to provide an interference fit between the tolerance ring 10 and the shaft and housing such that torque experienced by the shaft is transmitted to the housing.

Figure 6:
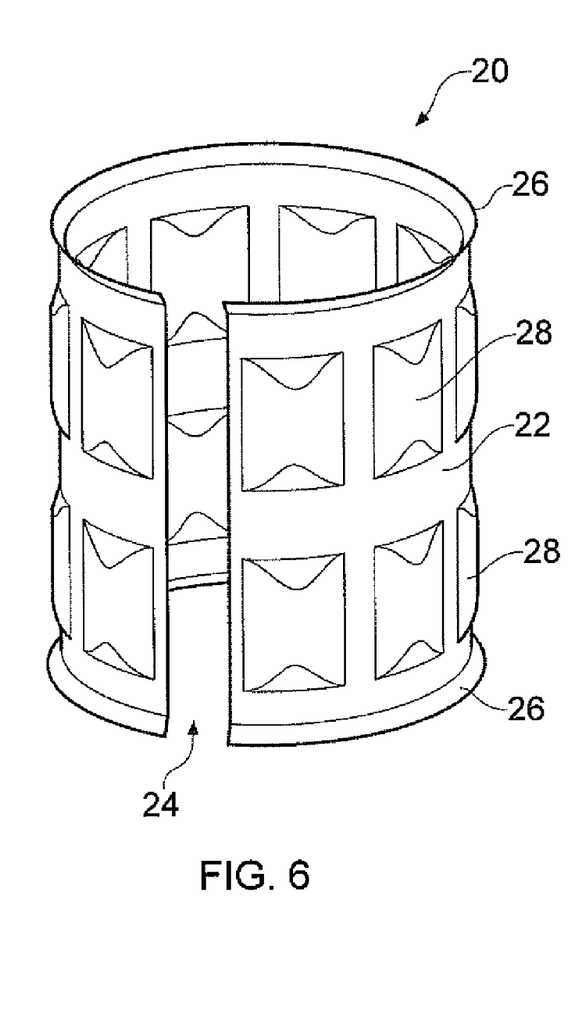
FIG. 6 shows a perspective view of a tolerance ring that is an embodiment of the invention.

FIG. 6 shows a tolerance ring 20 that is an embodiment of the invention. Similarly to the example shown in FIG. 5, the tolerance ring 20 is formed from a sleeve 22 of resilient material having a gap 24 down one side. Guide flanges 26 are provided along the top and bottom edges of the sleeve 22. These features correspond to those discussed above.

Figure 7:
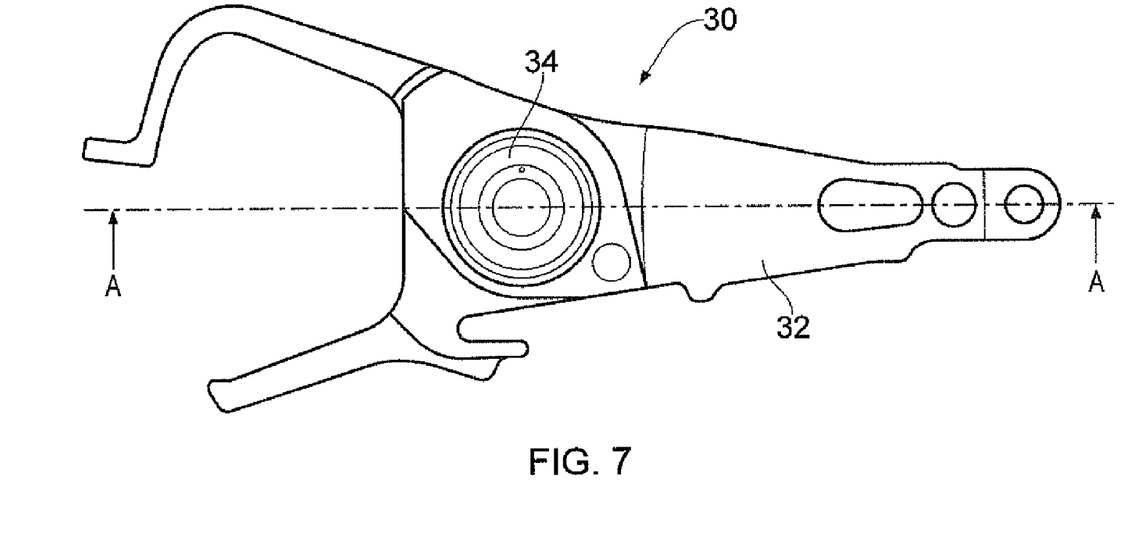
FIG. 7 shows a plan view of a hard disk drive pivot mount that includes the tolerance ring of FIG. 6.

The difference between the embodiment shown in FIG. 6 and the example shown in FIG. 5 comes in the projections 28 on the sleeve 22. To provide the "softer" profile of the invention, the projections 28 have a greater circumferential width compared to the diameter of the ring. As a result, in this embodiment there are fewer equally spaced projections around the circumference. Each of the projections have a similar radial peak height to the peak height used in the example of FIG. 5, although it is possible for the peak height to be increased. However, since they have a larger circumferential extent, this means that the rise to and fall from the peak is more gradual. Another way of softening the projections can include blending the projection edges (circumferential and/or axial) into the ring body to remove any sharp transitions, FIG. 7 shows an apparatus which incorporates the tolerance ring of FIG. 6. The apparatus shown in FIG. 7 is a hard disk drive pivot mount 30, which comprises an arm 32 adapted to retain magnetic recording disks and a pivot 34, which is rotatable on a bearing about a shaft. The tolerance ring (not shown in FIG. 7) provides an interference fit between the pivot 34 and the arm 32 such that the arm rotates with the pivot.

Figure 8:
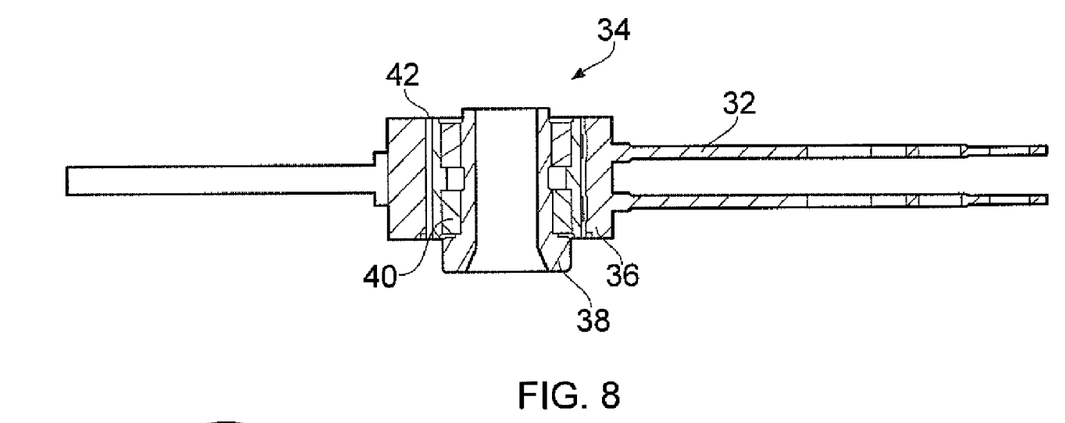
FIG. 8 shows a cross-section taken along the line A-A of the hard disk drive pivot mount shown in FIG. 7.
Figure 9:
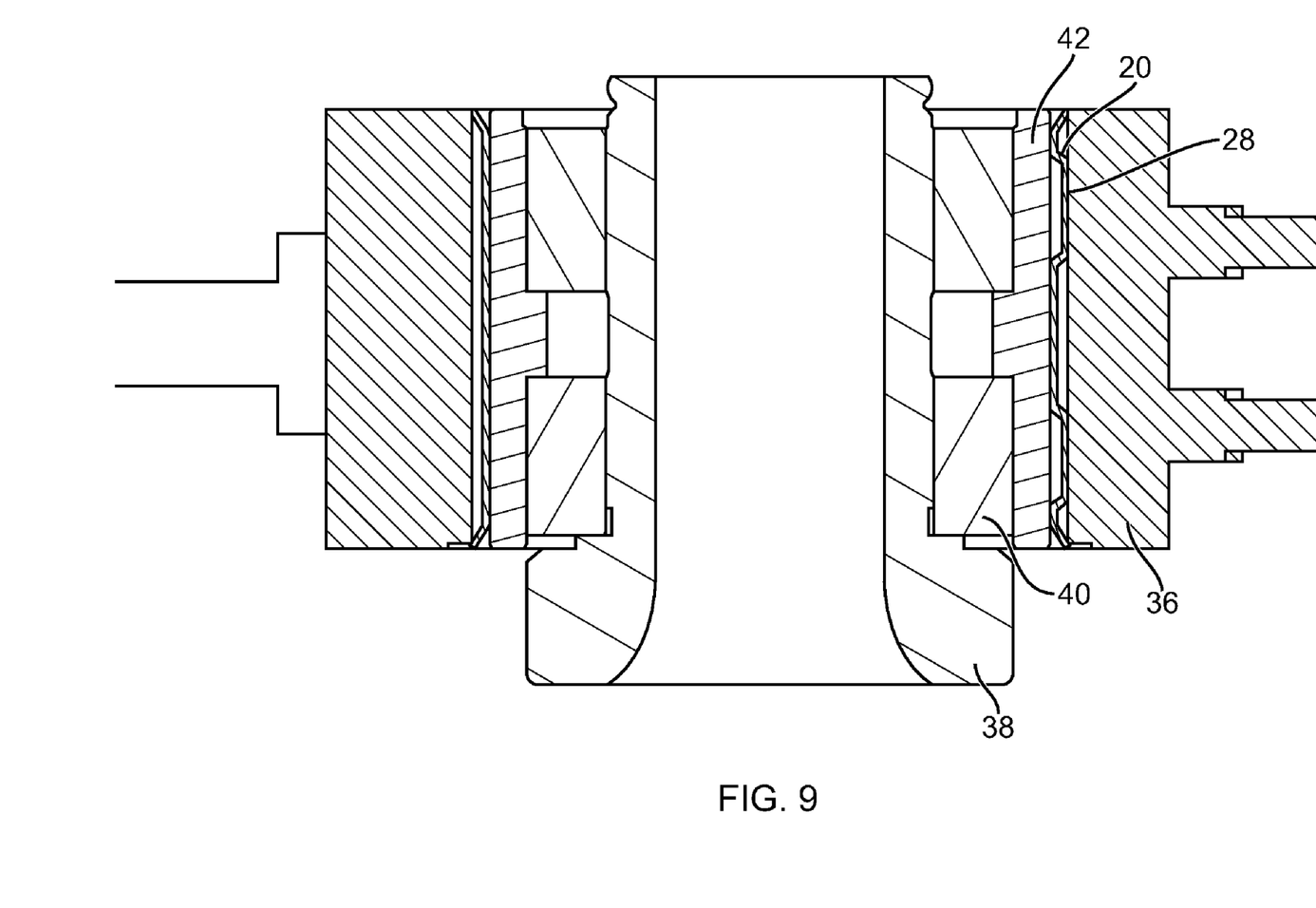
FIG. 9 shows a close up of the coupling between the arm and pivot of the hard disk pivot mount shown in FIG. 8.

FIG. 8 shows a cross-section taken along the line A-A in FIG. 7. FIG. 8 shows that the arm 32 comprises a circumferential housing 36 which includes a bore in which pivot 34 is received. The pivot 34 comprises a shaft 38 coupled via a bearing 40 to a rotatable sleeve member 42 the tolerance ring fits between the outer surface of the rotatable sleeve member 42 and the inner surface of the bore formed in the cylindrical housing 36. This is shown in more detail in FIG. 9. Here it can be seen how the projections 28 are compressed in the annular gap between the rotatable sleeve member 42 and the housing 36. As described above, the configurations of the projections 28 on tolerance ring 20 cause it to exhibit plastic behaviour when compressed in such a gap. With reference to FIG. 2, this provides a more stable retention force and assembly force. Greater control over resonance is therefore achievable.

Figure 10:
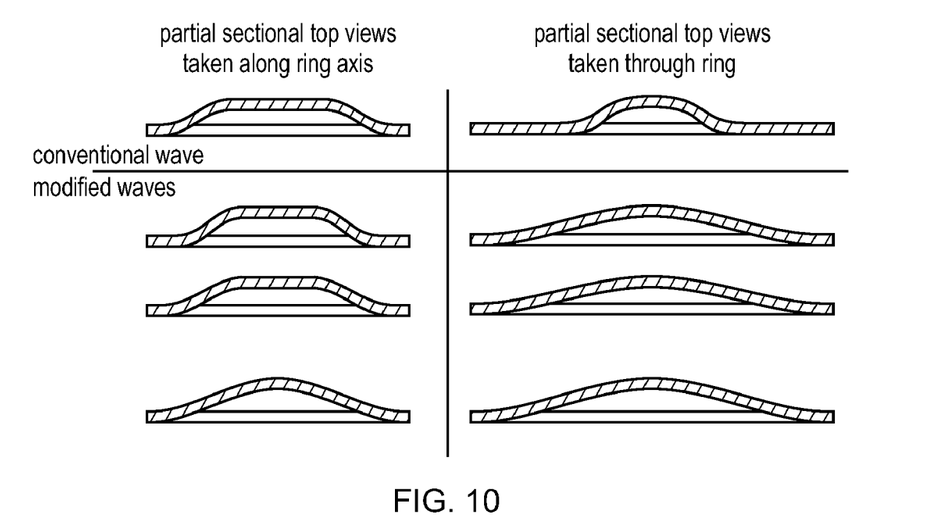
FIG. 10 shows partial sectional top views of tolerance ring wave geometries that may be used in the invention.
Figure 11:
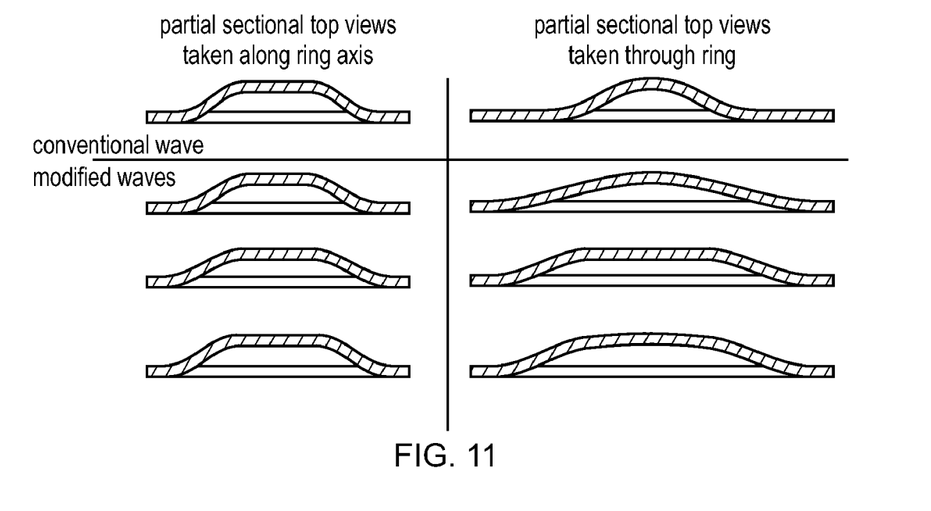
FIG. 11 shows partial sectional top views of further tolerance ring wave geometries that may be used in the invention.

FIGS. 10 and 11 illustrates ways in which conventional tolerance ring wave geometries may be modified to achieve the invention, i.e. to engineer the compression curve so that the ring operates into the plastic portion within a desired range of compression forces.

One way of causing tolerance ring to operate into the plastic portion of their compression force/retention force characteristic is to increase the load force. However, this may be undesirable, in particular where the tolerance ring is used to mount a bearing, because higher load forces can cause distortion of the bearing races and may increase the bearing rotation friction (pivot torque).

A solution to the above problem may be to make the projections (referred to here as "waves") 'softer', which means that they reach the plastic portion of their compression force/retention force characteristic at lower compression forces than conventional tolerance rings. Thus, for the same compression force, the modified wave operate into their plastic portion whereas conventional tolerance ring wave remain in their elastic portion.

In general, this can be achieved by altering the number of waves on a tolerance ring and by altering their shape, e.g. by modifying the wave radii (i.e. radial height of the wave peak) and/or angle of the slope to the peak and/or blend radius where the wave joins the body (band) of the tolerance ring.

In FIG. 10, the modified waves have a large wave radius (peak height) and a lower angle in the circumferential direction. This means they occupy a larger area, so there may be fewer waves on a given ring. The axial extent may be fixed. The smaller angles in this case are achieved by reducing the axial extent of the peak.

In FIG. 11, the modified waves have a smoother transition between the slope and the peak in the circumferential direction, whereby the cross-section resembles an arc. Again the waves have a lower angle in the circumferential direction, so they occupy a larger area. There are therefore fewer waves on a given circumference.

Larger wave radii and smaller wave angles may contribute to lower wave stiffness, which permits more compression of the wave at a given force. Thus the wave may operate into its plastic zone without the generation of compression loads that are inappropriate for use conditions, especially where thin walled components are used.

The invention claimed is:

1. A method of assembling a hard disk drive apparatus which comprises an inner component comprising a bearing mounted on a shaft to form a rotatable pivot and an outer component comprising an arm forming a housing having a bore therein, which outer component mates with the inner component by locating the rotatable pivot in the bore, the method comprising:
    mounting a tolerance ring either on the bearing of the inner component or in the bore of the outer component, the tolerance ring comprising an annular band having a plurality of radially extending projections which are compressible between the inner and outer components;
    mating the inner and outer components of the hard disk drive apparatus, thereby compressing the projections on the tolerance ring between the bearing and the housing to provide an interferance fit between the inner and outer components; and
    compressing the projections on the tolerance ring causes the tolerance ring to be in a generally flattened portion of its compression force/retention force characteristic, wherein:
        the projections exhibit significant plastic behaviour when compressed between the inner and outer components, and
        compressing is performed such that the tolerance ring is under a compressive force not greater than 3500 N.

2. The method of claim 1, wherein the flattened portion of the compression force/retention force characteristic includes a transition region from an elastic portion to a plastic portion of the characteristic.

3. The method of claim 2, wherein the transition region includes a region of decreasing gradient beyond the elastic portion.

4. The method of claim 1, wherein each projection has a gentle profile.

5. The method of claim 1, wherein the annular band has a diameter of less than 16 mm and a thickness of less than 0.2 mm.

6. The method of claim 1, wherein the annular band comprises a non-carbon steel.

7. The method of claim 1, wherein the radially extending projections comprise spaced-apart, discrete projections.

8. The method of claim 1, wherein the radially extending projections extend in directions away from the bearing.

9. A hard disk drive pivot mount apparatus comprising:
    an inner component comprising a bearing mounted on a shaft to form a rotatable pivot;
    an outer component comprising an arm forming a housing having a bore therein, wherein the outer component mates with the inner component by locating the rotatable pivot in the bore; and
    a tolerance ring located in the bore between the inner and outer components of the hard disk drive apparatus, wherein:
        the tolerance ring comprises an annular band including radially extending projections between the bearing and the housing to provide an interference fit between the inner and outer components;
        the tolerance ring is mounted between the bearing and the housing under a compressive force of not greater than 3500 N; and
        the projections have been significantly plastically deformed by the inner and outer components.

10. The hard disk drive pivot mount apparatus of claim 9, wherein each projection has a gentle profile.

11. The hard disk drive pivot mount apparatus of claim 9, wherein the annular band has a diameter of less than 16 mm.

12. The hard disk drive pivot mount apparatus of claim 9, wherein the annular band comprises a non-carbon steel.

13. The hard disk drive pivot mount apparatus of claim 9, wherein the radially extending projections comprise spaced-apart, discrete projections.

14. The hard disk drive pivot mount apparatus of claim 9, wherein the radially extending projections extend in directions away from the bearing.

15. A method of assembling a hard disk drive apparatus that comprises an inner component comprising a bearing mounted on a shaft to form a rotatable pivot and an outer component comprising an arm forming a housing having a bore therein, which outer component mates with the inner component by locating the rotatable pivot in the bore, the method comprising:
    mounting a tolerance ring on the bearing of the inner component or in the bore of the outer component, wherein the tolerance ring comprises an annular band; and
    mating the inner and outer components of the hard disk drive apparatus, wherein mating comprises compressing the projections on the tolerance ring between the bearing and the housing to provide an interferance fit between the inner and outer components, wherein compressing is performed at a compressive force not greater than 3500 N, and projections that radially extend from the annular band exhibit significant plastic behaviour compressing.

16. The method of claim 15, wherein each projection has a gentle profile.

17. The method of claim 15, wherein the annular band has a thickness of less than 0.2 mm.

18. The method of claim 15, wherein the annular band comprises a non-carbon steel.

19. The method of claim 15, wherein the radially extending projections comprise spaced-apart, discrete projections.

20. The method of claim 15, wherein the radially extending projections extend in directions away from the bearing.

* * * * *

UNITED STATES PATENT AND TRADEMARK OFFICE
CERTIFICATE OF CORRECTION

| | | |
|---|---|---|
| PATENT NO. | : 7,922,418 B2 | Page 1 of 1 |
| APPLICATION NO. | : 12/033241 | |
| DATED | : April 12, 2011 | |
| INVENTOR(S) | : Marcus Baker et al. | |

It is certified that error appears in the above-identified patent and that said Letters Patent is hereby corrected as shown below:

Column 8, line 49, delete "behaviour compressing" and insert therefor --behaviour during compressing--.

Signed and Sealed this
Thirty-first Day of July, 2012

David J. Kappos
*Director of the United States Patent and Trademark Office*